United States Patent [19]

Williamson et al.

[11] 4,322,801

[45] Mar. 30, 1982

[54] METHOD FOR CONTROLLING TRAFFIC FLOW

[75] Inventors: Richard A. Williamson, Danville; Derek Gitelson, Concord, both of Calif.

[73] Assignee: Multisonics, Inc., Dublin, Calif.

[21] Appl. No.: 131,315

[22] Filed: Mar. 18, 1980

[51] Int. Cl.[3] .............................................. G06F 15/48

[52] U.S. Cl. ...................................... 364/436; 340/40; 340/41 R

[58] Field of Search ............................... 364/436, 437; 340/35-37, 38 R, 40, 41 R, 43, 45

[56] References Cited

U.S. PATENT DOCUMENTS

| | | | |
|---|---|---|---|
| 3,500,309 | 3/1970 | Watanabe et al. | 340/37 |
| 3,618,004 | 11/1971 | Riddle, Jr. | 340/35 |
| 3,731,271 | 5/1973 | Muramatu et al. | 340/40 |
| 3,754,209 | 8/1973 | Molloy et al. | 340/40 |
| 3,792,431 | 2/1974 | Matysek | 340/40 |
| 3,920,967 | 11/1975 | Martin et al. | 340/36 |
| 4,023,017 | 5/1977 | Ceseri | 364/437 |
| 4,167,785 | 9/1979 | McReynolds et al. | 364/437 |
| 4,215,405 | 7/1980 | Brunner et al. | 364/436 |

*Primary Examiner*—Mark E. Nusbaum
*Assistant Examiner*—Gary Chin
*Attorney, Agent, or Firm*—Townsend and Townsend

[57] ABSTRACT

An intersection control system is described which coordinates a plurality of intersections each of which is responsive to local requests for service. Traffic control coordination is accomplished between a plurality of intersections by providing for each intersection an Intersection Control Unit capable of response to local demand and a variety of permitted phase conditions, and by providing a processing unit for each group of intersections (a Network Processing Unit) which determines the permitted phase conditions at the intersections within constraints of system-wide parameters, including a system-synchronizing background cycle. Each Network Processing Unit is provided with sets of special function timers, binary sensors and binary command switches which permit timing of the phases applicable to each intersection and which gate the splits in coordination with the background cycle. Selected phases are serviced in preference to other phases if adequate excess time is available prior to required synchronous operation according to demand within minimum and maximum split limits. In addition, the concept of a fixed phase is introduced, which permits the synchronization of all system operations to activation of a specific phase at a fixed time in a background cycle.

11 Claims, 10 Drawing Figures

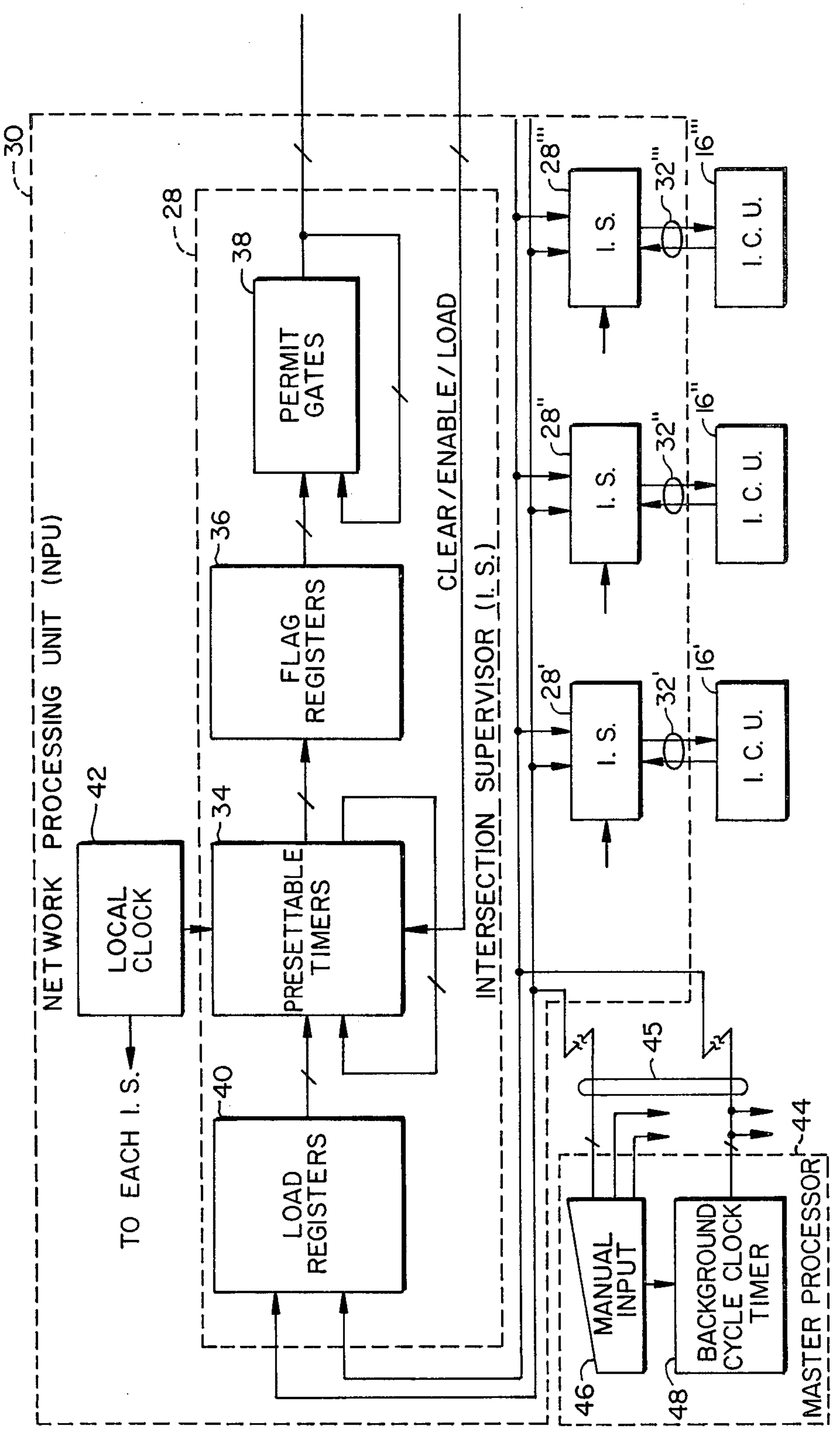
FIG.__4A.

FIG.__4.
| FIG. 4A. | FIG. 4B. |
|---|---|
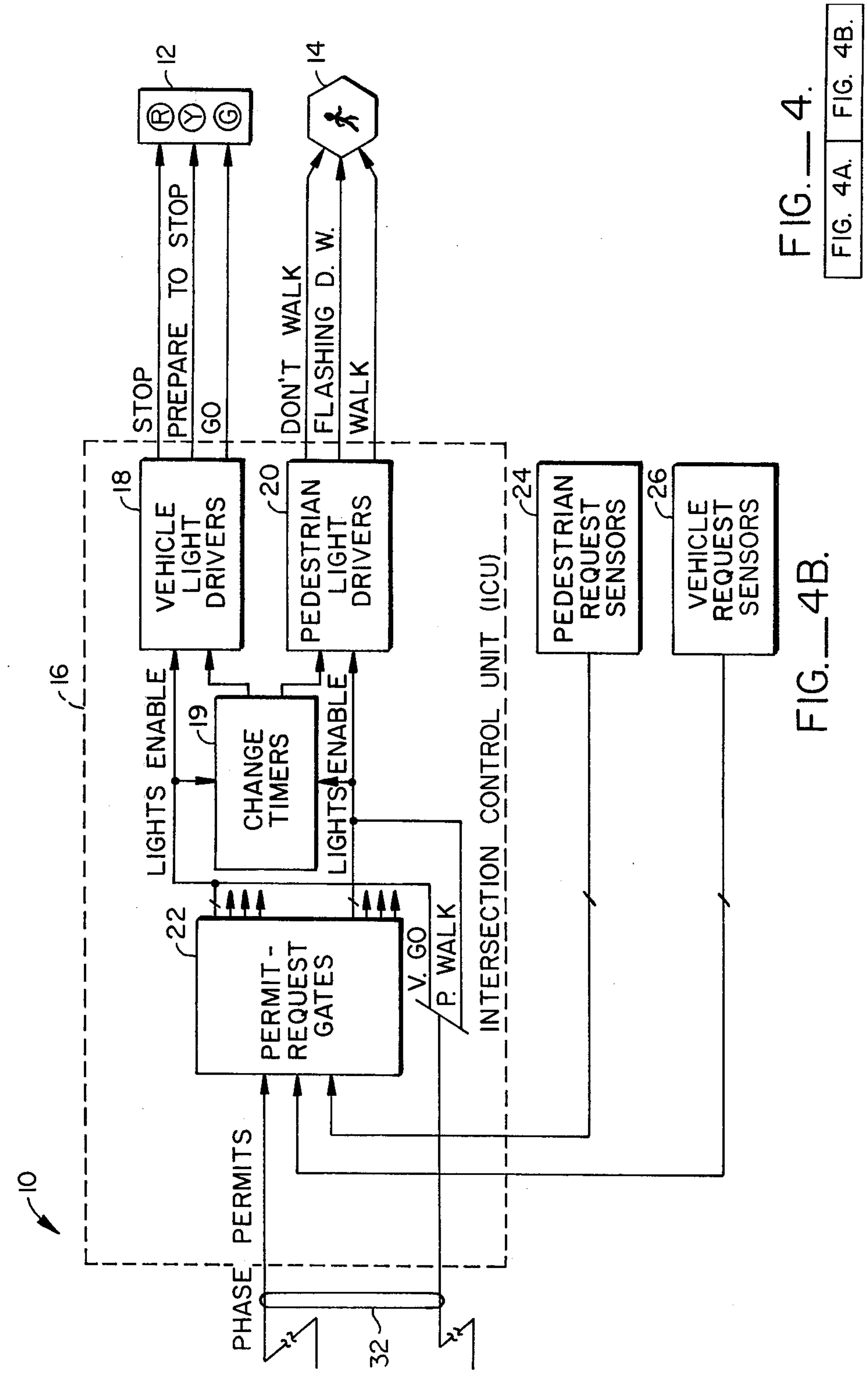
FIG.__4B.

| TIMER | PHASE 1 | 2 | 3 | 4 | 5 | 6 | 7 | 8 |
|---|---|---|---|---|---|---|---|---|
| EXPECTED ENTRY | 31 | 56 | 81 | 106 | 31 | 56 | 81 | 106 |
| LATE ENTRY | 42 | 56 | 92 | 117 | 42 | 56 | 92 | 117 |
| MUST ENTER | 0 | 56 | 0 | 0 | 0 | 56 | 0 | 0 |
| COOR MIN | 10 | 10 | 10 | 10 | 10 | 10 | 10 | 10 |
| SPLIT MAX | 21 | 21 | 21 | 21 | 21 | 21 | 21 | 21 |
| PREFERRED LAST ENTRY | 0 | 46 | 0 | 0 | 0 | 46 | 0 | 0 |
| PREFERRED MIN | 0 | 10 | 0 | 0 | 0 | 10 | 0 | 0 |
| PREFERRED CAN STAY | 0 | 56 | 0 | 0 | 0 | 56 | 0 | 0 |
| EXTENSION | 0 | 0 | 0 | 11 | 0 | 0 | 0 | 11 |

FIG.—6.

FLAG - PERMIT GATES (ONE PHASE)

| INPUT FLAGS | FLAG STATES 1 | 2 | 3 | 4 | 5 | 6 | 7 | 8 | 9 | 10 | 11 | 12 | 13 |
|---|---|---|---|---|---|---|---|---|---|---|---|---|---|
| CAN START | 1 | 1 | 1 | 1 | 0 | 0 | 0 | X | X | X | X | X | X |
| CAN STAY | 0 | 0 | 0 | 0 | 1 | 1 | 1 | X | X | X | X | X | X |
| MUST START | 0 | 0 | 0 | 1 | 0 | 0 | 0 | X | 0 | 0 | X | X | 0 |
| MUST HOLD | 0 | 0 | 0 | 0 | 1 | 0 | 0 | X | X | X | X | X | X |
| PREF CAN START | X | X | X | X | X | X | X | 1 | 1 | 1 | 0 | 0 | 0 |
| PREF CAN STAY | X | X | X | X | X | X | X | 0 | 0 | 0 | 1 | 1 | 1 |
| PREF MUST HOLD | X | X | X | X | X | X | X | 0 | 0 | 0 | 1 | 0 | 0 |
| OTHER PHASE MUST START | 0 | 1 | 0 | X | X | 0 | 1 | 0 | 1 | 0 | X | 0 | 1 |
| OTHER PHASE MUST STAY | 0 | 0 | 1 | X | X | 0 | 0 | 0 | 0 | 1 | X | 0 | 0 |
| | | | | | | | | | | | | | |
| OUTPUT PERMITS | | | | | | | | | | | | | |
| CURRENT PHASE PERMITTED | 1 | 0 | 0 | 1 | 1 | 1 | 0 | 1 | 0 | 0 | 1 | 1 | 0 |
| OTHER PHASES PERMITTED | X | 1 | 1 | X | X | X | 1 | X | 1 | 1 | X | X | 1 |

1 = YES

0 = NO

X = DON'T CARE

FIG._7.

PERMIT - REQUEST GATES (ONE PHASE)

| INPUT SIGNALS | INPUT STATES 1 | 2 | 3 | 4 | 5 | 6 | 7 | 8 | 9 |
|---|---|---|---|---|---|---|---|---|---|
| VEHICLE PERMIT | 1 | 1 | 1 | 1 | 0 | 1 | 0 | 1 | 1 |
| PEDESTRIAN PERMIT | 1 | 1 | 0 | 0 | 0 | 0 | 0 | 0 | 1 |
| VEHICLE REQUEST | X | 0 | X | 1 | X | 0 | X | X | 1 |
| PEDESTRIAN REQUEST | 1 | 1 | X | X | X | X | X | X | 0 |
| OTHER PHASE PERMIT | 0 | 0 | 1 | 1 | 1 | 1 | 1 | 1 | X |
| OTHER PHASE REQUEST | X | X | X | 1 | 1 | 1 | 0 | 0 | X |
| | | | | | | | | | |
| OUTPUT SIGNALS | OUTPUT STATES | | | | | | | | |
| VEHICLE GO | 1 | 1 | 1 | 1 | 0 | 0 | 0 | 1 | 1 |
| PEDESTRIAN WALK | 1 | 1 | 0 | 0 | 0 | 0 | 0 | 0 | 0 |
| PREPARE TO STOP | 0 | 0 | 0 | 0 | 1 | 1 | 0 | 0 | 0 |
| FLASHING DON'T WALK | 0 | 0 | 1 | 0 | 0 | 0 | 0 | 0 | 0 |

1 = YES
0 = NO
X = DON'T CARE

FIG._8.

METHOD FOR CONTROLLING TRAFFIC FLOW

BACKGROUND OF THE INVENTION

1. Field of Invention

This invention is related to intersecting traffic control, and in particular it relates to surface vehicular traffic control involving a plurality of crossing arteries with multidirectional propagation of traffic loads competing for passage through the intersections. The invention is intended for use with intersection signals which can be synchronized to a master clock by background cycle coordination.

Arterial traffic control system models exist which are suitable for applying load responsive control techniques to coordinate arterial traffic flow. The particular model of interest involves coordination of traffic signals based on a background cycle. A brief review of traffic engineering concepts and terminology is instructive to an understanding of the field of invention. Reference is made to *Traffic Control Systems Handbook* available from the United States Federal Highway Administration.

Fundamental to the understanding of the field of invention are the concepts of the multiple-phase intersection model, the phase, the split, the background cycle, and the offset. A multiple-phase intersection model is the mathematical model of the standard intersection. It comprises typically eight phases, a phase being an independently timed movement relative to an intersection. Specifically, a phase consists of an arterial crossing movement or a left turn movement which gives rise to potential conflicts. A typical eight-phase intersection model is illustrated in FIG. 1. FIG. 2 is a phase diagram, and FIG. 3 is a timing diagram.

Referring to FIGS. 1 and 2, the phase nomenclature of the eight-phase or quad intersection is defined. Phases One and Two are respectively a first left turn route and the opposing conflicting through route of the intersection. From those references, the left turn phases are numbered odd in a counter-clockwise manner and the through phases are numbered even in a counter-clockwise manner.

A background cycle (FIG. 3) is the quantum of time which must be set aside in a system of intersections for execution of a complete set of phases. In a background cycle coordinated traffic control system, the background cycle is at least as long as the shortest clock cycle to which all intersections in a group, i.e., synchronized set of intersections, can be synchronized.

Referring again to FIG. 3, a split is defined as the percentage of the background cycle during which a phase may be in green (allowed passage) or in yellow change (prepare to stop). In other words, a split is an allocation of the background cycle. There are generally two types of splits associated with each phase, the vehicle split and the pedestrian split. In each case, the split is the length of time allotted to the load (vehicle or pedestrian) to pass through the intersection. Background cycle coordination involves bunching the load into platoons and propagating the platoons through the intersection group with minimal interruption of flow.

Certain rules govern conflict resolution among phases. Reference is made to FIG. 2 which is a phase representation of the intersection model of FIG. 1. For example, only one phase in each one of the two sets comprising One through Four or Five through Eight may be active at one time. These sets are called the rings 1 and 2. A loop can be drawn around each ring. Where two active phases are present, both must be of or in transition to the phase set consisting of One, Two and Five, Six or the phase set consisting of Three, Four and Seven, Eight to assure conflict-free movement. These sets are considered to be on the same side of the "barrier" which divides the rings. Further, the total of all defined splits in each one of the rings 1 and 2 must equal one hundred percent of a fully serviced cycle. Further, the sum of the splits for the phases One and Two must equal the sum of the splits for the phases Five and Six, and similarly, the sum of the splits for the phases Three and Four must equal the sum of the splits for the phases Seven and Eight. Consequently, it is possible to analyze an intersection by merely examining one ring. These rules are sufficient to solve most intersection problems.

A further concept to be understood is the offset. The offset is the preselected time delay for nominal propagation of a platoon of vehicles between intersections in a group at a desired average vehicle speed. This concept is important to arterial background cycle coordination.

The primary method of arterial coordination of traffic flow is the background cycle in which there is specified a cycle length, multiple offsets between intersections, vehicle splits, pedestrian splits, phase sequence, and a synchronization of priority phases. What is needed is a traffic control system which not only can coordinate traffic flow but can respond to demand in individual phases without disrupting coordination.

2. Description of the Prior Art

Several traffic control systems are now in use or under development which are known to the art. The systems range from single intersection demand sensor systems which respond to presence of demand at each station (phase) of an intersection. Further systems are known to the art which are centralized decision-making systems. Examples are the central computer-based systems of Honeywell, Sperry Corporation, and the Federal Highway Administration Project known as the UTCS. These system employ sensors for volume and occupancy which convey demand information to a central station for processing. Absent a backup system mode, loss of telementry or central processor failure could mean loss of intersection coordination and control.

Traffic control systems have been under development at Multisonics, Inc. of Dublin, Calif., which distribute machine intelligence and machine decision-making responsibilities. For example, in the systems currently under development, autonomous Intersection Control Units (ICU) at each intersection are coupled in parallel to an autonomous Network Processing Unit (NPU), a set of which is coupled to a supervisory Master Processor (MP). The system is designed to minimize duplication of functions as well as to minimize data movement.

SUMMARY OF THE INVENTION

According to the invention, traffic control coordination is accomplished between a plurality of intersections by providing for each intersection an Intersection Control Unit capable of response to local demand and a variety of permitted phase conditions, and by providing a processing unit for each group of intersections (a Network Processing Unit) which determines the permitted phase conditions at the intersections within constraints of system-wide parameters, including a system-synchronizing background cycle. Each Network Processing Unit is provided with sets of special function timers, binary sensors and binary command switches which permit timing of the phases applicable to each intersection and which gate the splits in coordination with the background cycle. More specifically, a background cycle is specified whose length is equal to or longer than the time required to service all timed movements into each intersection in a group and which operates as a supervisory constraint of all intersection operations. Then within each intersection, splits are controlled subject to specified time constraints applicable to the specific split and the background cycle. Selected phases are serviced in preference to other phases if adequate excess time is available prior to required synchronous operation according to demand within minimum and maximum split limits. In addition, the concept of a fixed phase is introduced, which permits the synchronization of all system operations to activation of a specific phase at a fixed time in a background cycle. The specifics of the invention will be best understood by reference to the following detailed description taken in connection with the accompanying drawings.

BRIEF DESCRIPTION OF THE DRAWINGS

FIGS. 4A and 4B are together a system block diagram of a traffic control system according to the invention. They are referred to herein collectively as FIG. 4.

FIG. 6 is an illustration of the states of timers according to the invention at a selected moment in a cycle.

FIG. 7 is a logic table for a flag-permit gate means according to the invention.

FIG. 8 is a logic table for a permit-request gate means according to the invention.

DETAILED DESCRIPTION OF SPECIFIC EMBODIMENTS

Figure 1:
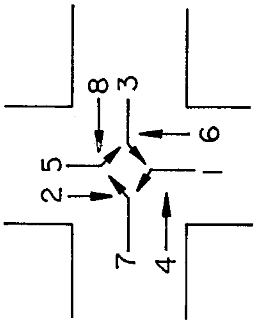
FIG. 1 is a schematic diagram of phase nomenclature of an eight-phase intersection.
Figure 2:
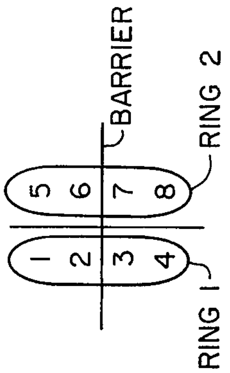
FIG. 2 is a phase diagram for a generalized eight-phase intersection.

The invention will now be explained relative to an intersection of the type illustrated in FIG. 1 based on the schematic diagram definitions associated with FIGS. 2 and 3 as has been set forth hereinabove. Specifically, the invention will be explained by reference to individual phases and rings. Elements of the system may be described with respect to only one phase. It should be evident where similar elements are to be employed in other phase subsystems of the system.

Referring to FIG. 4, a traffic signaling system 10 according to the invention is shown. One vehicle light face 12 and one pedestrian light face 14 together represent one of typically eight such faces for vehicles, representing eight phases, and four such faces for pedestrians, representing the number of phases typically required for servicing pedestrian traffice at a street intersection.

The vehicle light face 12 is enabled in three states by three types of signals, a Stop (red), a Prepare to Stop (yellow change), and a Go (green). The pedestrian light face is enabled in three states by three similar signals, a Don't Walk, a Flashing Don't Walk, and a Walk. These signals are generated by an Intersection Control Unit (ICU) 16. The ICU 16 comprises vehicle light drivers 18 and pedestrian light drivers 20 which are controlled by gates, designated herein permit-request gates 22, and internal change timers 19.

The permit-request gates 22 for each phase subsystem respond locally to pedestrian service requests from pedestrian request sensors 24 at the intersection crossings and to vehicle service requests from vehicle request sensors 26 usually embedded at strategic locations in the pavement at approaches to the intersection. The permit-request gates 22 only respond in the presence of supervisory signals which indicate which phases and phase segments are permitted to be active in a coordinated system. Thus, the supervisory signals are called permit signals. The permit signals are issued by an Intersection Supervisor (IS) 28.

The Intersection Supervisor 28 is typically a substantially autonomous subsystem of a Network Processing Unit (NPU) 30 which is conveniently located with respect to a group of intersections to be synchronized. One Intersection Supervisor 28, 28', 28'', 28''' is provided for each intersection in the group within the NPU 30. Each Intersection Supervisor 28 typically communicates at least once each second via telementry coupling 32, 32', 32'', 32''' with its Intersection Control Unit 16, 16', 16'', 16''' at the respective intersections.

Network organization of a group of intersections is chosen in part to minimize the telementry traffic and capacity requirements. As will be shown hereafter, only the barest of information is communicated between the Intersection Supervisor 28 and the Intersection Control Unit 16. For example, selected output states of the permit-request gates 22 of each ICU 16 are coupled to the NPU 30 through the return of telementry lines 32. The selected output state signals which are so coupled are typically binary representations of the Go and Walk signals from which certain timing information is developed by the IS 28 as hereinafter explained. It is important to note here that the IS 28 does not directly rely on or process the individual service requests of each phase. That is solely a function of the ICU 16.

Each IS 28 comprises four principal elements, namely, a presettable timer means 34, flag register means 36, permit gate means 38 and load register means 40. A local clock 42 typically services all Intersection Supervisors 28 within an NPU 30. The output of the load register means 40, containing storage for computed and preselected timer values, is coupled to the timer means 34. The timer means 34, comprising three classes of special purpose presettable timers, is coupled to receive preset values from the load register of the load register means 40 upon issuance of load signals out of the ICU 16 and the contents of the load registers of load register means 40 as hereinafter explained. The local clock 42 is coupled to the timer means 34 to decrement the presettable timers of timer means 34. The outputs of timer means 34 are coupled to the flag register means 36 and also back to selected timers and load registers in the timer means 34 and load register means 40.

The flag register means 36 monitors the status of one or more timers in the presettable timer means 34 as hereinafter explained. The load register means 40 is operative to load the presettable timer means 34 with computed time segments. The output of the flag register means 36 is coupled to the permit gate means 38. The permit gate means 38 analyzes the output of the flag register means 36 and generates a simple binary signal per phase which indicates whether the phase is permitted to be active during the current interval. The binary signal is conveyed in real time through telemetry lines 32 to the ICU 16.

The entire traffic system controller 10 is coordinated from a Master Processor (MP) 44. The MP 44 is the operator-system interface. It is typically located at a central office and communicates through a telementry coupling 45 with a number of Network Processing Units 30. The MP 44 comprises off-line manual input means 46, on-line background cycle clock timer 48, and other functional elements (not shown) which are not pertinent to an understanding of the invention. (The other elements are typically for system monitoring). Through the manual input means 46, an operator can enter operating parameters for the system and for each intersection, including phase order, background cycle length, designation of priority phases and preferred service phases, offset between intersections, split allocations among phases, and other parameters about intersection operation which are typically determined by prior traffic loading experience and intersection analysis. The parameters affecting each intersection are generally loaded into the load register means 40. The parameters can be modified by traffic response analysis, time of day, time of the week, or at any time depending on, for example, need for priority access to an artery (e.g., emergency vehicle use).

One of the advantages of this versatility is the ability to establish a priority phase which not only commences in synchronism with a system background cycle, (as a synchronized phase or sync phase), but also the ability to establish the priority phase as phase having a fixed initiation and duration relative to the background cycle.

One of the system parameters specified by the operator is the length of the background cycle. Since this is a parameter common to all intersections in a group, it is preset at the Master Processor 44, and specifically in the background cycle clock timer 48. The background cycle clock timer 48 is preset to a value equal to the maximum background cycle length and is operative to decrement to zero whereupon it recycles from its preset value. Its online output is simply a numerical value which can be sampled at any time by the Intersection Supervisors 28 to determine the reference point in time for each local operation. The sampled value is emmployed to preset selected timers of the presettable timer means 34.

Figure 3:
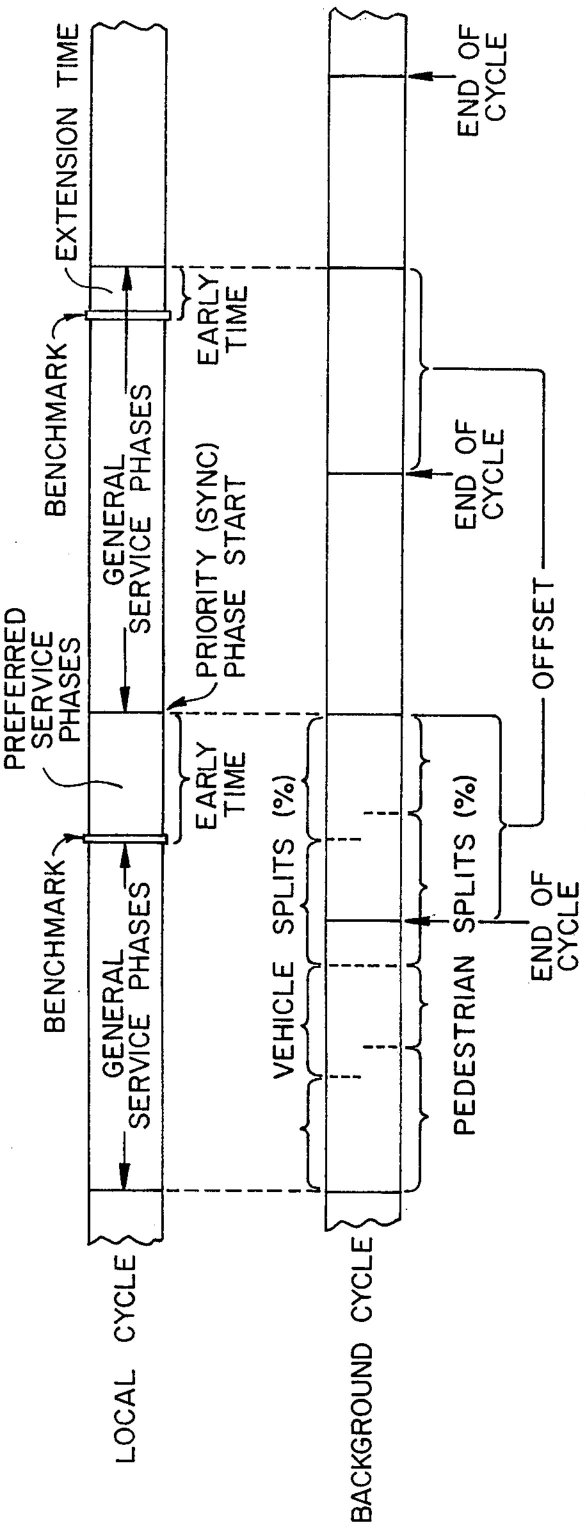
FIG. 3 is a timing diagram for illustrating relationships between a background cycle and a local cycle according to the invention.
Figure 5A:
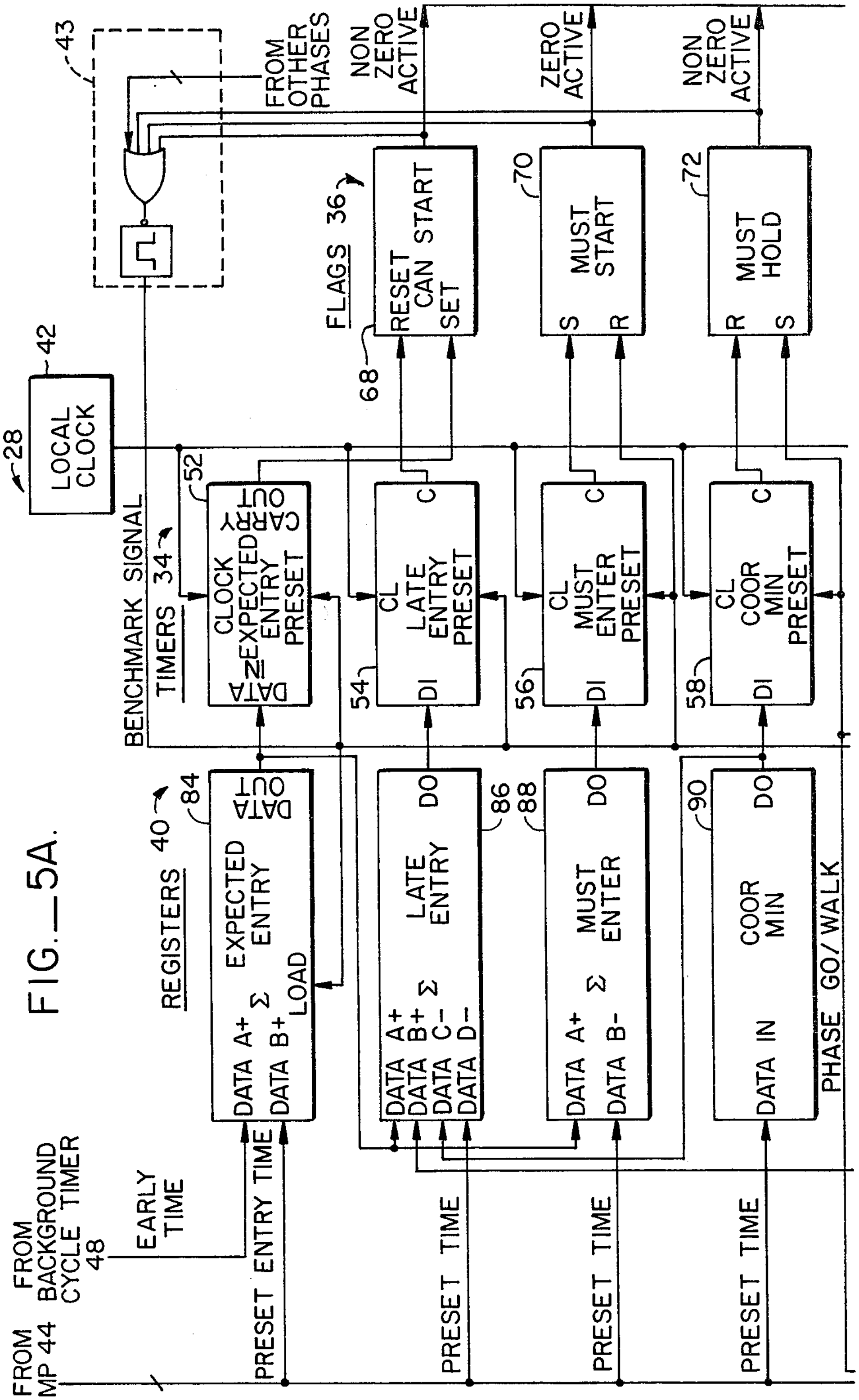
FIGS. 5A and 5B are together a block diagram of a portion of an intersection supervisor according to the invention. They are referred to herein collectively as FIG. 5.
Figures 5, 5B:
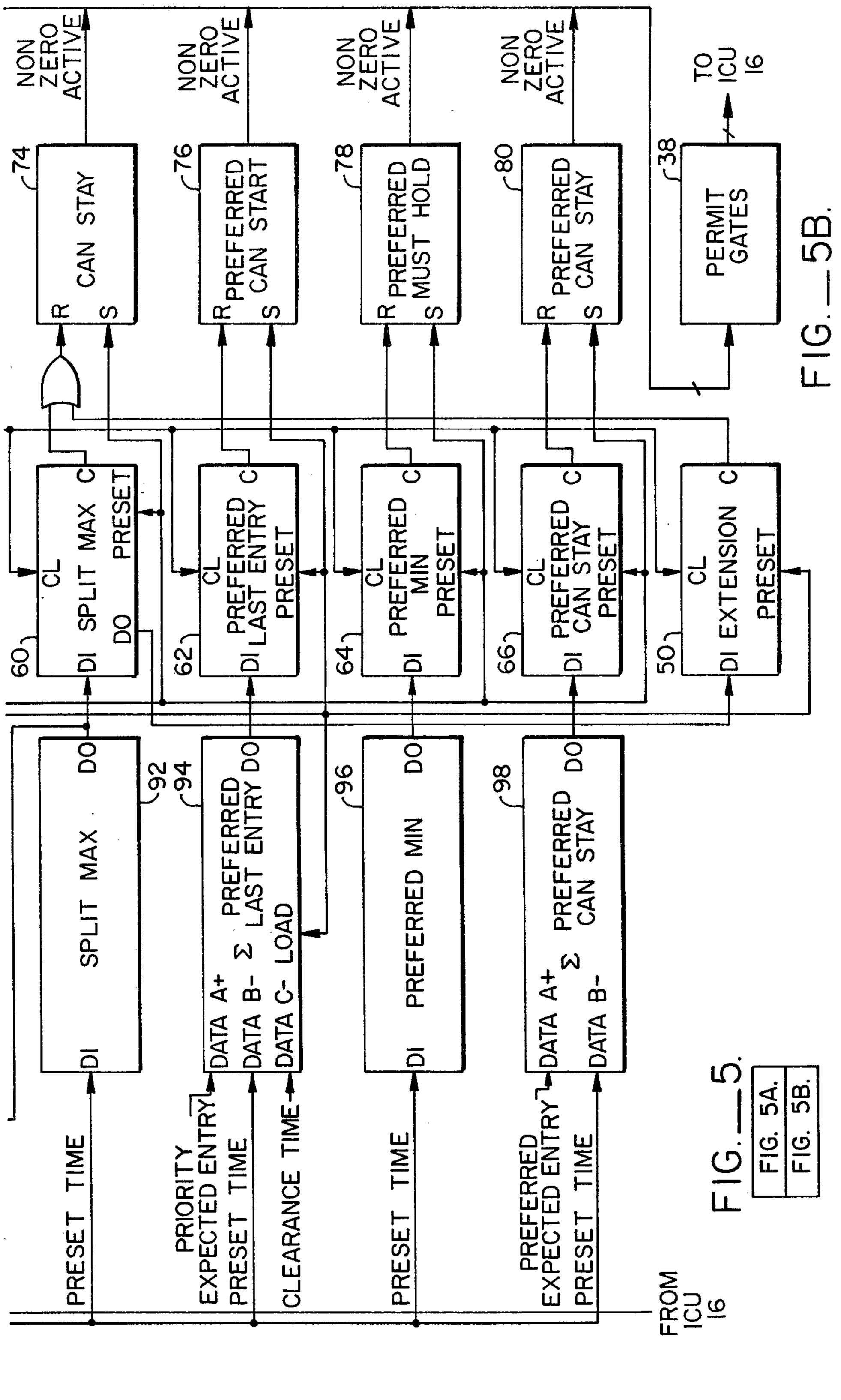

Turning now to FIGS. 3 and 5, important operational aspects of the invention are defined. In order to understand the invention, it is necessary to understand the concepts of Early Time and Benchmark. The Benchmark is the reference time which marks the commencement of each local service cycle. The Benchmark is generally referenced to the barrier preceding the priority phase, which is the synchronization phase (sync phase). This barrier is the division in the cycle preceding the phase which must be synchronized with the background cycle. The Benchmark varies from zero time units relative to the priority phase to a time advance of up to the next preceding barrier. For example, as soon as all general service phase barriers are serviced, the cycle is prepared to cross a time barrier. The barrier crossing becomes the Benchmark for the next cycle. The time difference between the actual time instant of crossing and the designated time instant for commencement of the portion of the ring containing the priority phase is defined as the Early Time.

According to the invention, the Early time is added to the present values in each cycle which define the phase sequence to assure that the priority phase is serviced at the proper time interval without respect to the point of commencement of the cycle. Further according to the invention, the Intersection Supervisor 28 includes three classes of presettable timers, associated load registers, and flag registers, which monitor the timers. Each phase is provided with its own set of timers, load registers and flag registers.

The three classes of timers and register are Entry, Split and Preferred Service. Among the Entry Timers for each phase are an Expected Entry Timer 52, a Late Entry Timer 54 and an obligatory or Must Enter Timer 56. Among the Split Timers for each phase are the Coordinated Minimum (Coor Min) Timer 58, the Extension Timer 50 and the Split Maximum (Split Max) Timer 60. The third class of timers includes those timers necessary to service preferred phases during a general service subcycle after the servicing of all phases of the local cycle. The third class of timers specifically includes a Preferred Last Entry Timer 62, a Preferred Minimum Timer 64 and a Preferred Can Stay Timer 66. As will be seen, the Preferred Last Entry Timer 62 is an Entry-type timer analogous to the Late Entry Timer 54, and the preferred Minimum Timer 64 and the Preferred Can Stay Timer 66 are analogous to the Coor Min Timer 58 and the Split Max Timer 60, respectively.

The flags of the flag register means 36 monitor the various timers. Specifically, there is a Can Start Flag 68 which monitors the Expected Entry Timer 52 and the Late Entry Timer 54, a Must Start Flag 70 which monitors the Must Enter Timer 56, a Must Hold Flag 72 which monitors the Coor Min Timer 58, a Can Stay Flag 74 which monitors the Split Max Timer 60 and the Extension Timer 50, a Preferred Can Start Flag 76 which monitors the Preferred Last Entry Timer 62, a Preferred Must Hold Flag 78 which monitors the Preferred Minimum Timer 64, and a Preferred Can Stay Flag 80 which monitors the Preferred Can Stay Timer 66.

The load register means 40 comprises an Expected Entry Register 84, the output of the Expected Entry Register 84 being coupled to a data input of the Expected Entry Timer 52, a Late Entry Register 86, the output being coupled to the data input of the Late Entry Timer 54, a Must Enter Register 88, the output being coupled to the data input of the Must Enter Timer 56, a Coor Min Register 90 with the data output coupled to the data input of the Coor Min Timer 58, a Split Maximum Register 92 with the data output coupled to the data input of the Split Maximum Timer 60, a Preferred Last Entry Register 94 with the data output coupled to the data input of the Preferred Last Entry Timer 62, a Preferred Minimum Register 96 coupled to the data input of the Preferred Minimum Timer 64, and a Preferred Can Stay Register 98 coupled to the data input of the Preferred Can Stay Timer 66.

The registers of the load register means 40 are best understood by a definition of the content at initialization, usually at the Benchmark. Early Time, derived from the background cycle timer 48 is provided as an input to the Expected Entry Timer 84, to which is added the preset phase enetry time based on the allocation of the splits for prior phases in the local cycle. The Benchmark signal from a Benchmark signal generator 43 is provided at the load input of the Expected Entry Register 84. Consequently, the Expected Entry Register 84 for each phase contains the Early Time plus the sum of the preceding Split Times in its current cycle. For example, the Expected Entry Register 84 for the first phase in an eight-phase cycle contains the value zero plus the Early Time. If the Split Time for the first phase is twenty seconds, the Expected Entry Register 84 for the second phase in sequence contains the value twenty seconds plus the Early Time.

The Coor Min Register 90 contains the operator preset value defining the minimum green (Go/Walk) time assigned to the phase for servicing the phase. The Split Max Register 92 contains the operator preset maximum time for servicing a green (Go/Walk) signal.

The Late Entry Register 86 is preloaded with the latest time one can enter the phase, service the minimum green time and proceed to the next phase with sufficient time for all subsequent phases to service the splits remaining in the cycle before the cycle must end. The Late Entry Register 86 is loaded with the sum of the Expected Entry Register 84, the Split Max Register 92, the negative of the output contents of the Coor Min Register 90 and the negative of any preset time (typically intersection clearance time).

The Must Enter Time 88 is provided to indicate the time relative to the Benchmark when the phase must become active. The Must Enter Timer 88 is operative only for a priority phase, such as a sync phase or a fixed phase. Accordingly, the Must Enter Register 88 is loaded with the contents of the Expected Entry Register 84, less any preset time, when enabled by an indication that the phase is to receive priority service.

In order to understand the function of the preferred class of load registers, timers and flag registers, it is necessary to understand the concept of preferred service. Under conditions where all phases of a cycle have been fully serviced according to demand following a Benchmark, there may be excess time before the beginning of the next sync phase. According to the invention, the excess time in the cycle, if sufficient, is set aside for servicing preferred phases. The preferred class of timers and registers is operative only during the preferred service segment of the local cycle (FIG. 3).

The Preferred Last Entry Timer 62, for example, is analogous to the Late Timer 54. The Preferred Min Timer 64 is analogous to the Coor Min Timer 58 and the Preferred Can Stay Timer 66 is analogous to the Split Max Timer 60. The Preferred Min Timer 64 contains the operator-preset minimum time that the preferred phase must be active to service the phase during the preferred service portion of the cycle. The Preferred Can Stay Timer 66 contains the amount of time the preferred service phase can be active and exit if necessary to service the priority phase in synchronization with the background cycle.

The Preferred Min Register 96 is loaded with an operator-preselected value. The Preferred Can Stay Register 98 is loaded with the contents of the Expected Entry Register 84 and the sync phase, less the preset clearance time of the preferred phase if the preferred phase is not priority phase. The Preferred Last Entry Register 94 is loaded with the output contents of the priority phase Expected Entry Register 84, the negative of the contents of the Preferred Min Register 96, and the negative of the preset preferred phase clearance time.

There are no specific registers associated with the Extension Timer 50. The Extension Timer 50 is loaded with the contents of the Split Max Timer 60 at the Benchmark, and its output is coupled to the Can Stay Flag Register 74 for the purpose of extending an actual Can Stay flag in the event there is time remaining in the Split Max Timer 60 at the end of a local cycle.

Each of the timers has a data input, a preset input, a clock input, and a carry output. In addition, the Split Max Timer 60 has a data output which is coupled to the data input of the Extension Timer 50. The Can Start flag is normally active when the Late Entry Timer 54 is non-zero. The Must Start flag is normally activated when the Must Enter Timer 56 reaches zero. The Must Hold flag is normally active when the Coor Min Timer 58 is non-zero and the phase feedback signal from the intersection Control Unit 16 is Go or Walk only. The Can Stay flag is active when the Split Max Timer 60 is non-zero and the feedback signal from the Intersection Control Unit 16 is Go or Walk only, or when the Extension Timer 50 is non-zero. The Preferred Can Start flag is active when the Preferred Last Entry Timer 62 is non-zero. The Preferred Must Hold flag is active when the Preferred Minimum Timer 64 is non-zero. The Preferred Can Stay flag is active when the Preferred Can Stay Timer 66 is non-zero.

According to the invention, Benchmark occurs when the Late Entry Timer 54, the Must Enter Timer 56, and the Coor Min Timer 58 all time out for all phases. At Benchmark, the preferred class of timers are enabled, and the other classes of timers are reinitialized to synchronize with the priority phase of the succeeding background cycle.

FIG. 6 is a table showing the status of nine timers at a Benchmark prior to a priority phase, which in this case is Phase Two and Phase Six. Phases Five through Eight are duplicates of Phases One through Four, respectively, in this system. Values for seventy-two timers are shown, namely, Expected Entry, Late Entry, Must Enter, Coor Min, Split Max, Preferred Last Entry, Preferred Min, Preferred Can Stay, and Extension for each of the eight phases. By examination of the table, it will be noted that thirty-one seconds is registered in the Expected Entry Timer for Phase one. This represents the amount of Early Time between the Benchmark and synchronization with the priority phase, which in this system is the second phase. The Extension Timer contains eleven seconds for Phase Four. This represents the amount of time that Phase Four can stay active and still service the priority phase.

In Phase Two, it will be noted that the Preferred Min Timer is set to ten seconds. This indicates that this phase is also the preferred phase and that any request during the preferred service portion of the cycle can be serviced before the beginning of the priority phase in synchronization with the background cycle. The Split Max time is set at twenty-one seconds, which represents twenty-five seconds less a four-second time for vehicle clearance of the intersection. If the system were working in what is called a Pedestrian Split (Ped Split), the split times would be adjusted and the Split Max time would be increased or decreased to account for the longer clearance time required on phases with pedestrian demand. The Coor Min time has been set at ten seconds by the operator, indicating that the operator desires that each phase be serviced for at least ten seconds during the general service phases. The purpose of the other timers will be apparent from examination of the values.

Turning to FIG. 7, there is shown a truth table for the random logic defining the permit gate means 38 (FIG. 4). The permit gate means 38 analyzes the flags of the flag register means 36 to produce a single permit signal per phase per split which is communicated to each phase at the Intersection Control Unit 16.

The various input flags for each phase of the permit gate means 38 are the Can Start, Can Stay, Must Start, Must Hold, Preferred Can Start, Preferred Can Stay, and Preferred Must Hold. Other input flags are the Other Phase Must Start and the Other Phase Must Stay, which refer to the activation of a Must Start or a Must Stay flag in any other phase in that ring. The outputs are either the Current Phase Permitted or Other Phases Permitted. The flag and permit states are indicated as follows: A 1 indicates a yes, indicating that a state is activated or permitted; a 0 indicates a no, indicating that a state is not permitted; and an X indicates don't care or that the state could be either yes or no.

Across the table are listed the various combinations of flag states. The ordering of the columns from left to right indicates generally the sequence in which activation of flag states might occur.

Referring to Column 1, when the Can Start flag is active and no other flags are active, including the Must Start and Must Stay flags of other phases, then the Current Phase Permitted output is active.

When the Can Start flag is active but either the Must Start or Must Stay flags are active (Columns 2 and 3), then the Current Phase Permitted output is inactivated and locked out, while Other Phase Must Start or Must Stay are permitted.

When the Can Start flag and the Must Start flag are active, the Current Phase Permitted output is activated, without respect to the state of any other flag or phase (Column 4).

The Can Start flag may become inactive, but the Can Stay and Must Hold flags remain active. Under those circumstances (Column 5), the Current Phase Permitted is activated without respect to the state of the Permit output on any other phase. When the Can Stay flag is active and there is neither an Other Phase Must Start nor an Other Phase Must Stay flag which is active, and all other current phases are also active, then the Current Phase Permitted output is activated.

When there is a request elsewhere which is evidenced by the activation of an Other Phase Must Start flag then the Current Phase Can Stay flag is allowed to time out while the Current Phase Permitted flag is deactivated and the Other Phase Permitted output is activated (Column 7).

Activities during the preferred service portion of the cycle are represented by Columns 8 through 13. These columns correspond to the activities of Columns 1, 2, 3, 5, 6, 7, respectively. It should be noted that a Must Start flag must be inactive in the conditions represented by Columns 9, 10 and 13, in order for the Current Phase Permitted output to be inactive. The Must Start flag overrides any other state which would lock out the Current Phase Permitted output.

The operations illustrated in FIG. 7 can be implemented in various devices. For example, a relatively simple implementation could be constructed in a Read Only Memory device or its equivalent. Alternatively, the operations of the table could be reduced to practice with random logic using digital logic gates or in a programmable device such as a process-oriented microcomputer.

Since the output of the permit gate means 38 consists of only one binary switch state per phase, the telemetry signal conveyed to an Intersection Control Unit 16 (FIG. 4) consists merely of one binary state per phase, or alternatively one binary state per phase for vehicles and one binary state per phase for pedestrians.

Turning now to FIG. 8, there is shown a logic table for a permit-request gate means 22. Its implementation is similar to that of the permit gate means 38. The table of FIG. 8 illustrates the interaction of vehicle permit states and gate permit states, which are the output signals of the permit gate means 36, with vehicle requests and pedestrian requests which are generated locally at the intersection. Only one phase is illustrated. The input signals are a Vehicle Permit, a Pedestrian Permit, a Vehicle Request, a Pedestrian Request, Other Phase Permit, and Other Phase Request. The output signals, which define all possible states for the signal indicators of a phase at an intersection are Vehicle Go (green), Pedestrian Walk, Prepare To Stop (vehicle yellow change), and Flashing Don't Walk. The input states are set out in the order they may typically occur.

The states of the input signals produce the following outputs: If on entry of a phase there is an outstanding pedestrian Request and a Pedestrian Permit, the Vehicle Go and Pedestrian Walk output signals are activated (Column 1). If there is a Pedestrian Request and no Vehicle Request or Other Phase Permit input signal which is active, the Vehicle Go and Pedestrian Walk output signals will remain active (Column 2). As soon as another phase is permitted, in the presence of an active Vehicle Permit and an active Pedestrian Permit, the Flashing Don't Walk output signal is activated (Column 3). If the Vehicle Permit and the Pedestrian Permit signals are active, and the Other Phase Permit and Request signals are activated, then the Vehicle Go output signal is activated (Column 4). In the absence of active Vehicle Permit input and Pedestrian Permit input signals and in the presence of Other Phase Permit and Request input signals, the Prepare To Stop output signal is activated, and the Vehicle Go output signal is deactivated (Column 5). The Prepare To Stop and Flashing Don't Walk signals time out after a predetermined period to Stop or Don't Walk signals in response to internal timers.

When a Vehicle Permit input signal is activated in the presence of active Other Phase Permit and Request input signals, but in the absence of a Vehicle Request input signal, there will be no change in phase, but the Prepare To Stop signal will be activated (Column 6). Absent an active Vehicle Permit signal, an active Pedestrian Permit signal and an Other Phase Request signal, but in the presence of an Other Phase Permit signal, no signal is activated, the Prepare To Stop signal having timed out, from which it follows that the output indicators are enabled to display a Stop/Don't Walk signal (Column 7). However, upon activation of a Vehicle Permit signal and an Other Phase Permit signal in the absence of active Pedestrian Permit signal and an Other Phase Request signal, the Vehicle Go output signal is activated (Column 8). When there is an active Vehicle Request without an active Pedestrian Request in the presence of an active Vehicle Permit and an active Pedestrian Permit, then the output is an active Vehicle Go signal only (Column 9). It is to be noted that seemingly conflicting output signals have been allowed by the logic in the Intersection Supervisor 28, but the permit-request gates 22, combined with the change timers 19, assure that no conflict exists at the intersection.

The invention has now been explained with reference to specific embodiments. Other embodiments will be apparent to those of ordinary skill in the art in light of this disclosure. Therefore, it is not intended that this invention be limited except as indicated by the appended claims read in accordance with a reasonable interpretation of the specification.

What is claimed is:

1. In an intersection system for controlling signal indicators of selected phases at a plurality of intersections in a group, said system having at least a first subsystem and a second subsystem, said first subsystem having as input signals a master timer signal of a recursive fixed length background cycle and selected signal states of said signal indicators, said second subsystem having as input signals at least one signal state indicative of a service permit for each phase from said first subsystem and at least one signal state indicative of a service request for each phase from the intersection, a method for allocating access to the intersection among the phases separated by a time barrier, wherein each phase is allocated a subdivisional split of a recursive local cycle of variable length, and wherein at least one phase is a priority phase designated for priority service in synchronism with the background cycle, said method comprising:

synchronizing the local cycle to said background cycle by providing a Benchmark signal at the barrier preceding said priority phase for each local cycle;

issuing from said first subsystem to said second subsystem a service permit signal for each phase at selected intervals in the local cycle in response to the Benchmark signal in a manner to assure service to said priority phase in synchronism with said background cycle; and switching, by means of said second subsystem, said intersection signal indicators of a phase to a condition of intersection access only upon confluence of said service permit signal and said service request signal in a manner to avoid conflict between said phases.

2. The method according to claim 1 wherein each phase is serviced a first time in a preselected sequence in said local cycle and wherein said synchronizing step includes adding as early time to the succeeding local cycle the amount of time between the priority phase and the barrier for propagating unused time into the succeeding local cycle.

3. The method according to claim 2 further including:

designating one phase as a preferred service phase; and servicing said preferred service phase a second time without reference to said background cycle prior to servicing said priority phase whenever sufficient early time is available prior to scheduled initiation of said priority phase of the succeeding local cycle.

4. The method according to claim 2 or 3 further including establishing said priority phase as a phase of fixed initiation and minimum duration relative to said background cycle.

5. The method according to claim 2 wherein said first subsystem includes, for each phase, permit gate means for issuing said service permit signals, a first class of timers for timing entry functions relative to the Benchmark signal, a second class of timers for timing split functions for active phases and a third class of timers for timing entry and split functions for selected phases during a subcycle of the local cycle, further including the steps of:

timing the expected entry of each phase to be serviced with said first class of timers;

timing the last possible entry time for each phase to be serviced with said second class of timers;

timing the obligatory entry time for each priority phase with said third class of timers; and conveying flag signals indicative of time and no time states of said timers as input signals to said permit gate means.

6. The method according to claim 5 further including the steps of:

timing the minimum duration of each active phase;

timing the maximum duration of each active phase; and conveying flag signals indicative of time and no time states of said timers to said permit gate means.

7. The method according to claim 6 further including the steps of:

designating one phase as a preferred service phase;

servicing said preferred service phase a second time without reference to said background cycle prior to servicing said priority phase whenever sufficient early time is available prior to scheduled initiation of said priority phase of the succeeding local cycle; including timing the last possible entry time for servicing said preferred service phase;

timing the minimum time said preferred phase may be active; and conveying flag signals indicative of time and no time states of said preferred service last entry timer and said preferred service minimum timer as input signals to said permit gate means.

8. The method according to claim 7 further including the steps of:

timing any excess phase active availability time or can stay time after said Benchmark signal; and conveying flag signals indicative of time and no time states as input signals to said permit gate means.

9. In an intersection control system comprising a background cycle timer coupled to an intersection supervisor which is provided with a local clock, wherein the intersection supervisor is coupled to an intersection control unit which is operative to control the states of phase signal indicators in responser to signals indicative of a request for intersection passage, a method for controlling intersection passage comprising:

conveying a signal from said background cycle timer to said intersection supervisor representative of time instant within a fixed length recursive background cycle for synchronization of said intersection supervisor to the background cycle;

timing specified allowable states of each phase of the intersection with selected ones of presettable timers;

synchronizing said selected ones of said presettable timers to said background cycle timer by providing a Benchmark signal upon confluence of selected states of selected ones of said timers;

resetting selected ones of said timers upon occurrence of said Benchmark signal to establish the beginning of a local cycle;

synchronizing to a designated priority phase referenced to said background cycle timer by means of said intersection supervisor for servicing said priority phase at a preselected time;

conveying the states of said timers as a single binary service permit signal per phase to said intersection control unit;

conveying signals representative of selected ones of said intersection indicator states from said intersection control unit to said timers for resetting said timers at selected state transitions; and switching by means of said intersection control unit said intersection signal indicators of a phase to a condition of intersection access only upon confluence of said service permit signal and said intersection passage request signal.

10. A system for controlling intersection access at a plurality of intersections comprising:

a master processor means coupled to a plurality of intersection supervisor means for conveying a background cycle time and selected operating parameters to said intersection supervisor means;

a plurality of intersection supervisor means, each intersection supervisor means being operative to originate and to communicate permitted state information to an intersection control unit and being generally remote from said master processor means and from an intersection, each said intersection supervisor means being adapted to be coupled to an intersection control unit means at an intersection; and an intersection control unit means for controlling signal face indicators at an intersection, said intersection control unit means having as input signals service request signals from sensors at said intersection and being operative to independently generate a local cycle of intersection access signals, said intersection control means being further operative to coordinate requests for intersection use which are generated as service request signals from said sensors with said permitted state information when said permitted state information information is communicated to said intersection control unit means, such that responses to requests for intersection use are substantially independent of said master processor means.

11. The system according to claim 10 wherein said intersection supervisor means comprises:

selected load registers coupled to selected presettable times for presetting selected said presettable timers;

presettable timers coupled to selected flag registers;

flag registers coupled to gate means for indicating status of said timers; and gate means for generating said permitted phase access signal for each phase in response to status of said timers.

* * * * *

UNITED STATES PATENT AND TRADEMARK OFFICE

CERTIFICATE OF CORRECTION

PATENT NO. : 4,322,801

DATED : March 30, 1982

INVENTOR(S) : Richard A. Williamson, Danville; Derek Gitelson, Concord, bothof California It is certified that error appears in the above—identified patent and that said Letters Patent is hereby corrected as shown below:

In column 2, line 41 change "These system" to --These systems--.

In column 5, line 48-49, change "emmployed" to --employed--.

In column 6, line 66 change "enetry" to --entry--.

Signed and Sealed this

*Seventeenth* Day of *August 1982*

[SEAL]

*Attest:*

GERALD J. MOSSINGHOFF

*Attesting Officer* *Commissioner of Patents and Trademarks*